(12) United States Patent
Streicher

(10) Patent No.: US 7,234,864 B2
(45) Date of Patent: Jun. 26, 2007

(54) MEASUREMENT OF MULTI-CHANNEL COLD JUNCTION TEMPERATURE

(75) Inventor: Steven R. Streicher, Cincinatti, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/955,765

(22) Filed: Sep. 30, 2004

(65) Prior Publication Data

US 2006/0067377 A1 Mar. 30, 2006

(51) Int. Cl.
*G01K 7/00* (2006.01)

(52) U.S. Cl. .................... 374/179; 374/166

(58) Field of Classification Search ........ 374/182, 374/181, 137
See application file for complete search history.

(56) References Cited

U.S. PATENT DOCUMENTS

| | | | | |
|---|---|---|---|---|
| 3,648,523 A * | 3/1972 | Kemper et al. | ............. | 374/182 |
| 3,688,295 A * | 8/1972 | Tsoras et al. | ............. | 374/181 |
| 3,757,207 A * | 9/1973 | Hire | ............. | 324/417 |
| 3,988,171 A | 10/1976 | Miller et al. | ............. | 136/237 |
| 4,115,785 A * | 9/1978 | Hoopes et al. | ............. | 346/34 |
| 4,482,261 A * | 11/1984 | Dewey et al. | ............. | 374/181 |
| 4,558,342 A | 12/1985 | Sclar | ............. | 257/460 |
| 4,718,777 A * | 1/1988 | Mydynski et al. | ............. | 374/181 |
| 4,804,272 A * | 2/1989 | Schmitz | ............. | 374/181 |
| 5,046,858 A * | 9/1991 | Tucker | ............. | 374/179 |
| 5,364,008 A | 11/1994 | Stacher et al. | ............. | 228/103 |
| 5,484,206 A * | 1/1996 | Houldsworth | ............. | 374/181 |
| 5,669,713 A * | 9/1997 | Schwartz et al. | ............. | 374/1 |
| 6,104,962 A | 8/2000 | Sastry | ............. | 700/86 |
| 6,293,700 B1 * | 9/2001 | Lund et al. | ............. | 374/181 |
| 6,469,916 B1 | 10/2002 | Kerkman et al. | ............. | 363/41 |
| 6,564,163 B2 * | 5/2003 | Yoda | ............. | 702/130 |
| 2005/0155640 A1 * | 7/2005 | Schuh | ............. | 136/224 |
| 2005/0259719 A1 * | 11/2005 | Phillips | ............. | 374/179 |

FOREIGN PATENT DOCUMENTS

JP 10-160592 * 6/1998

\* cited by examiner

*Primary Examiner*—Gail Verbitsky
*Assistant Examiner*—Mirellys Jagan
(74) *Attorney, Agent, or Firm*—Patrick S. Yoder; Alexander R. Kuszewski

(57) ABSTRACT

The cold junction temperature of the channels on a multi-channel terminal block are accurately determined for each terminal pair without affixing a thermistor to each terminal. One embodiment provides accurate cold junction measurement of a six channel device (12 terminals) by mounting or directly affixing only three sensors (e.g., thermistors). The present technique decreases cost by reducing the number of sensors to less than the number of channels or terminals, while providing for accurate cold junction measurement at each channel.

27 Claims, 5 Drawing Sheets

MEASUREMENT OF MULTI-CHANNEL COLD JUNCTION TEMPERATURE

BACKGROUND

The present invention relates generally to the field of temperature measurement and thermocouple devices. More particularly, the invention relates to a novel technique for effectively determining thermocouple cold junction temperature in a multi-channel terminal configuration.

Thermocouples are devices used to measure temperature and are one of the more versatile temperature sensors available. These temperature sensors or transducers are generally rugged and relatively inexpensive, and may be constructed of various metals. Thermocouples may be used to measure a relatively wide range of temperatures (e.g., −200° C. to 2600° C.) in a variety of applications and environments. In general, thermocouples rely on the principle that a voltage potential occurs when there is a temperature gradient along the length of a conductor.

A thermocouple device is formed by joining two conductors or wires of dissimilar metals to form a junction of the two wires called a measuring junction (or sensing junction, and so on). Although almost any two types of metal can be used to make the thermocouple wires, a number of standard types are used because they possess predictable output voltages and large temperature gradients. The several types of thermocouples available may be designated by capital letters that indicate their composition according to American National Standards Institute (ANSI) conventions. For example, a J-type thermocouple has one iron conductor and one constantan (copper-nickel alloy) conductor.

The thermocouple measuring junction may be encased in a sensor probe, for example, with the probe positioned at the point of temperature measurement (i.e., at the temperature source). In principle, as the temperature of the measuring junction changes with the temperature source, a temperature gradient is formed (along the wires) between the measuring junction and the opposite free ends of the two wires. Advantageously, a predictable thermoelectric voltage is generated as a function of this temperature gradient. By taking into account the composition of the two dissimilar metal wires, this generated thermoelectric voltage (sometimes called the "Seebeck" voltage) can be related to the temperature gradient along the wires. This temperature gradient is summed with a reference or "cold" junction temperature to give the temperature of the source being measured. Thermocouple measurements typically require sensing or determining the reference temperature (the cold junction temperature) where the thermocouple wires connect to the voltage measurement system.

In construction, the two free ends of the wires may be connected at a voltage measuring instrument (e.g., an analog to digital instrument, voltmeter, control instrument, terminal block, terminal strip, temperature control module etc.) to measure the thermoelectric voltage. The connection of these two wires at a terminal block, for example, forms the second junction of the wires called the reference junction (or cold junction). The term "cold junction" comes from the traditional practice of holding this reference junction at zero degrees Celsius in an ice bath. However, maintaining an ice bath is not practical for most measurement applications. Thus, the actual temperature of the point of connection of the thermocouple wires to the measuring instrument is measured and recorded. Typically cold junction temperature may be sensed by a thermistor or other temperature sensor or device, which is in relatively good thermal contact with the input connectors of the measuring instrument. Again, this second temperature reading, the cold junction temperature, is used by the measuring instrument to calculate the true temperature at the thermocouple tip, the measuring junction.

In sum, to determine the measured temperature of the source (i.e., the component, process, system, equipment, etc.) at the measuring junction of the two wires, the calculated temperature gradient based on the measured voltage is summed with the cold junction temperature (e.g., measured with a thermistor) at the voltage measuring instrument or terminal block. Thus, in operation, a thermocouple measures temperature by generating a voltage (e.g., millivolt) proportional to the temperature difference between the measuring and cold junctions of two dissimilar metals. For smaller changes in temperature, the voltage is substantially linearly proportional to temperature difference. For relatively larger changes in temperature, the relationship may become non-linear.

In ever-increasing demanding applications in precision temperature measurement, and with equally-demanding desires to reduce costs, the cold junction temperature measurement can be problematic. In a variety of configurations, errors in the measurement of the cold junction temperature give errors in the measurement of the source temperature. A typically accurate but expensive technique is to use a high-accuracy thermistor affixed to each terminal or to the channel that contains the two terminals. A less expensive but also less accurate solution is a single integrated circuit sensor. A particular problem is with multi-channel terminal blocks that may be a strip of channels or tiers of channels, which may include up to 30 or more channels (60 terminals or terminations), for example, to receive wires from several thermocouples and other devices forming several cold junctions. Relatively significant temperature gradients may exist across the rows or steps of the multi-tier terminal block. There is a need, therefore, for cost-effective and accurate measurement of cold junction temperature in single row and multi-tier terminal blocks, which may have several input terminals on multiple rows. Mounting a single temperature sensor (i.e. thermistor) on each row may not be adequate because of a change in the temperature profile along the terminal row (tier, strip, etc.). A cost-prohibited option is to mount a thermistor at each terminal or channel. For multi-tier or multi-channel terminal blocks and other termination devices, there is a need to provide for an efficient, cost-effective, accurate, and precise temperature measurement of the cold junction (i.e., reference junction).

BRIEF DESCRIPTION

The present technique is designed to respond to such needs. The cold junction temperature of all of the terminals on a multi-channel terminal block, for example, are accurately determined for each terminal pair without affixing a thermistor to each pair. For example, an embodiment provides accurate cold junction measurement of a six channel device (12 terminals) by mounting (directly affixing) only three sensors (thermistors). The present technique decreases cost by reducing the number of sensors to less than the number of channels or terminals, while providing for accurate cold junction measurement at each channel. The technique provides for algorithms to interpolate and/or extrapolate, or otherwise calculate the temperatures of each input channel. For example, instead of assuming a single value which is the same for all channels, a temperature is determined for each channel on an individual basis. The technique increases accuracy because it benefits by terminals arranged in consecutive order on a single tier, row, or strip, and thus a single axis, for accurate interpolation/extrapolation. In general, by maintaining a high level of accuracy, the technique will reduce cost by reducing the number of expensive, high accuracy thermistors or equivalent sensors required for thermocouple cold junction measurements.

In one embodiment, a method of using thermocouple includes disposing a temperature sensor at three or more respective terminals along a terminal strip having a plurality of terminals adapted to receive thermocouple signals; measuring temperatures at the three or more terminals; calculating temperatures of remaining terminals based on measured temperature values of the three or more terminals having the disposed temperature sensors; and calculating a cold junction temperature of the terminal strip of at least one thermocouple channel based on measured or calculated values of the terminals, or a combination thereof.

In another embodiment, a method of measuring cold junction temperature in a multi-channel configuration includes disposing temperature sensors at three respective terminals on a on a row of a multi-channel input device; measuring a temperature at the three terminals; interpolating or extrapolating, or a combination thereof, the temperature at the three terminals to give a temperature of remaining terminals on the row of the multi-channel input device; and combining terminal temperatures to determine the cold junction temperature of the respective channels.

In yet another embodiment, an instrumented multi-channel input/output terminal assembly includes a multi-channel terminal strip for receiving inputs from a plurality of thermocouples; and at least three temperature sensors disposed at respective postions along the terminal strip, the temperature sensors being configured to detect a temperature at a respective postion along the terminal strip and to provide a signal representative of the temperature to a processing circuit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
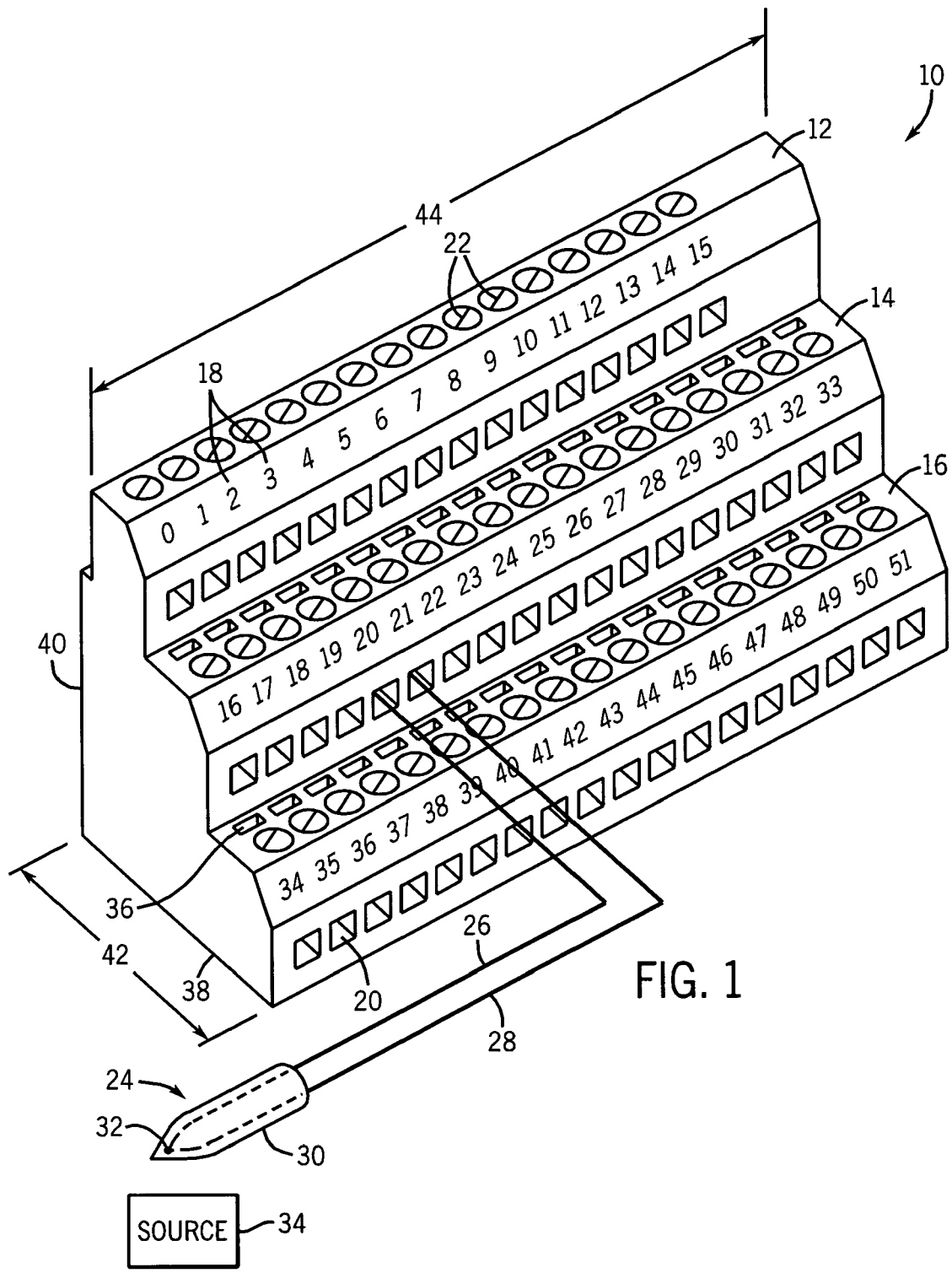
FIG. 1 is a perspective view of an exemplary multi-tier terminal block for at least one thermocouple in accordance with certain aspects of the invention.

Turning now to the drawings, FIG. 1 illustrates an exemplary multi-channel or multi-tier terminal block 10 having terminal strips or tiers 12, 14, and 16. On each tier, there are terminals generally designated by the reference numeral 18, with typically two per channel for a single input device, such as a thermocouple. For example, terminals, #0 and #1 are for channel 1, terminals #2 and #3 are for channel 2, and so forth. Incoming wires may enter the input slots 20, and the screws 22 may be rotated to clamp or secure the input wires in the slots 20 at the terminals 18. A plurality of input wires may originate from a variety of devices and input to the terminal block 10. In this example, the two illustrated wires are for a thermocouple 24. As discussed below, a thermocouple 24 generally has two dissimilar metal wires 26 and 28, and may employ a protective sheath or probe 30 at the measuring junction 32 of the two wires 26 and 28. The tip of thermocouple 24 probe 30 is shown positioned to measure the temperature of a source 34.

The thermocouple wires 26 and 28 enter the terminal block 10 at input slots 20, forming the reference junction or cold junction of the two wires 26 and 28 at the two terminals (e.g., terminals #20 and #21) of the respective channel. An analog or digital output of the terminal block may exit from the bottom of the terminal block 10, for example, to a control system or electronic device as described below. Additionally, output slots 36 may be provided for analog output wires for typical 4–20 milliamp signal, for example. It should be noted that the terminal block 10 is only given as an example, and that a variety of terminal blocks or strips, or other input/output (I/O) devices, may be employed with the present technique. For the illustrated embodiment, the bottom 38 and back 40 of the multi-tier terminal block 10 may mount to an electronic substrate, such as a printed circuit board (e.g., via pins), a terminal base, an instrument bus, an input/output device, other temperature module components, and so forth. Furthermore, the terminals 18 and tiers 12, 14, and 16 may provide for different functions, such as power connections, input/output, co-junction connections, chassis grounds, and so forth.

The multi-tier terminal block 10 may be employed alone as part of a thermocouple system, or in conjunction with a machine monitoring and protection system designed as a distributed network of modules deployed on an open standard industrial bus, and so forth. The terminal block 10 may be part of an intelligent multi-channel temperature monitor, in a package, for example. Further, the terminal block 10 may be configured for a resistance temperature detector (RTD), an isolated thermocouple, grounded thermocouple, and so forth. In certain applications, the terminal block 10 may be integrated in a standard industrial bus system, such as Device Net. In other applications, the modules may be provided with standard 4 to 20 milliamps outputs for each channel (i.e., via output slots 36). Furthermore, applications requiring integral relays may be accommodated via module linking and extension relay modules, for example. In sum, the terminal block 10 as part of a temperature module may operate as a stand alone, with no interface to higher level control systems or interactive user interfaces, or they can be deployed on a standard or dedicated Device Net network, for example, where they may provide real-time data and information to other modules, programmable logic controllers (PLC), distributed control systems (DSC), conditions monitoring systems, and so on. Configuration may be formed remotely via the Device Net network, for example or locally by a personal computer connected to the integral serial interface on the temperature module. For local configuration, a serial configuration utility may be packaged with the relay module.

The temperature of the terminal block 10 (the cold junction temperature) is typically required to calculated the temperature of the source 34. In less demanding applications, a single thermistor, for example, may be positioned anywhere on the terminal block 10, to give a single temperature value for the entire terminal block 10, with the assumption that the block 10 operates under substantially isothermal conditions. However, in increasingly common demanding applications, a relatively accurate (and precise) temperature measurement is needed at each terminal 18. Indeed, non-isothermal behavior of the block 10, especially along rows of multiple channels, is often significant enough to cause errors in the temperature measurement of the various sources 34 if only one thermistor is used per row, In general, temperature differences may exist along the width 42 or length 44 of the terminal block 10. Thus, though an expensive option, a temperature sensor, such as a thermistor may be installed at each terminal 18 to provide for accurate reference or cold junction temperatures. This expensive option may avoid errors in the measurement of cold junction temperature, and thus avoid the related errors in the measured temperature from the thermocouple tip (measuring junction).

Figure 2:
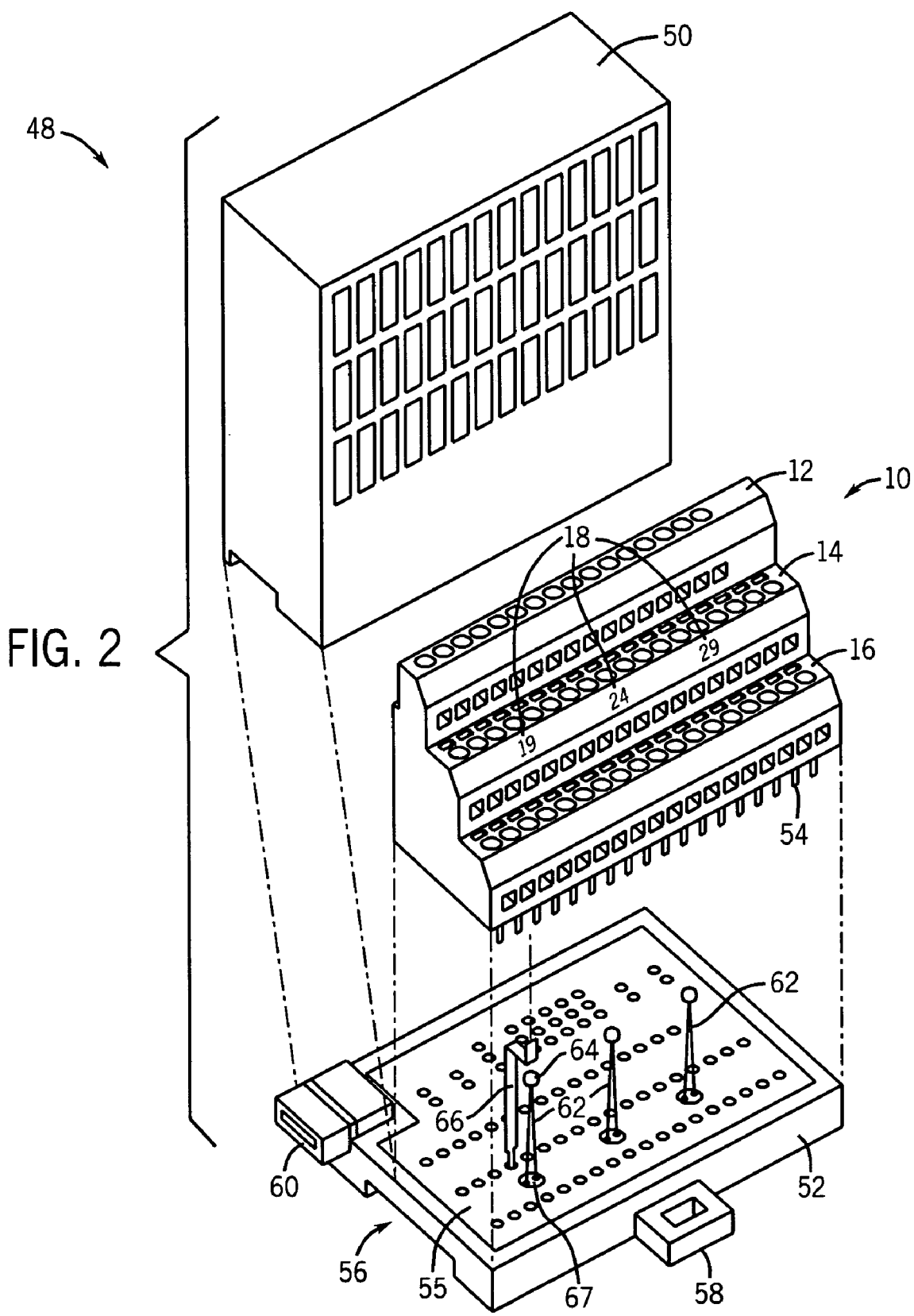
FIG. 2 is a simplified perspective view of an exemplary temperature module incorporating the multi-tier terminal block of FIG. 1 in accordance with certain aspects of the invention.

FIG. 2 is a simplified perspective view of an exemplary temperature module 48 incorporating the multi-tier terminal block 10 of FIG. 1. The exemplary temperature module 48 may represent, for example, Entek XM™ temperature modules manufactured by Rockwell Automation of Milwaukee, Wis. However, it should be apparent that a variety of other terminal blocks/strips, input/output devices, and so on may be utilized with the present technique. Further, the technique may be applied to a variety of devices other than thermocouples (e.g., resistance temperature detectors, differential pressure devices, etc.) requiring a reference property (e.g., temperature, pressure, flow, etc.) of a termination or end point.

In the exemplary temperature module 48, the terminal block 10 may couple to an input/output module 50 which may contain a bus interface and circuitry needed to perform specific functions related to a given application. The terminal block 10 (e.g., of FIG. 1) may mount to a terminal base unit 52, or may be integral with such a base unit. Also within the exemplary module 48, the terminal block 10 and terminal base 52 may accommodate termination wiring for thermocouples, millivolt inputs, and the like. Pins 54 may be provided for communication and/or interface with a printed circuit board 55. The printed circuit board 54 may include a variety of components and devices. Furthermore, the terminal base unit 52 may include a slot 56 and/or a locking tab 58 to accommodate mounting and/or locking into place the base unit 52 to a device internet network (DIN) rail or other devices and connections. A connector 60, such as a flexbus connector may be employed by the terminal base unit 52. In the illustrated embodiment, the connector 60 is a female flexbus connector. However, it should be apparent that male connectors may also be included, and the various connectors may be oriented at different locations along the terminal base unit 52.

In this example, three thermistors 62 are employed to measure the cold junction temperature at three terminals 18 (numbers 19, 24, and 29). Of course, more than three thermistors 62 may be employed, and the temperature at a variety of the terminals 18 may be measured. The resistive element 64 of the thermistor 62 interfaces with the clamp 66 to measure the temperature of the thermocouple wire engaged with the clamp 66 within the terminal 18. As discussed, as the screw 22 (FIG. 1) at the terminal is rotated, the clamp 66 engages the thermocouple wire within the terminal.

Features previously discussed may be utilized by the temperature module 48. For example, the module 48 may be configured to measure either an RTD or an isolated thermocouple, or designed specifically for thermocouple measurements, isolated or grounded. For applications where it is not possible to integrate the temperature module 48 directly via a bus, such as Device Net, the modules provide for standard 4 to 20 milliamp outputs for each channel via slots 36, for example. The temperature module 48 may operate stand alone, with no interface to higher level control systems or interactive user interfaces, or they can also be deployed on a standard or dedicated device net network where they can provide real time data and status information to other temperature modules, PLCs, DCSs, and conditional monitoring systems. As previously discussed, the configuration can be performed remotely via a network or locally by personal computer connected to an integral serial interface. And again, the terminals 18 on the terminal block 10 may be used for power connections, cold junction connections, chassis grounds, input/output wiring, input/output commons, etc. Further, the temperature module 48 may be daisy-chained to additional modules.

Figure 3:
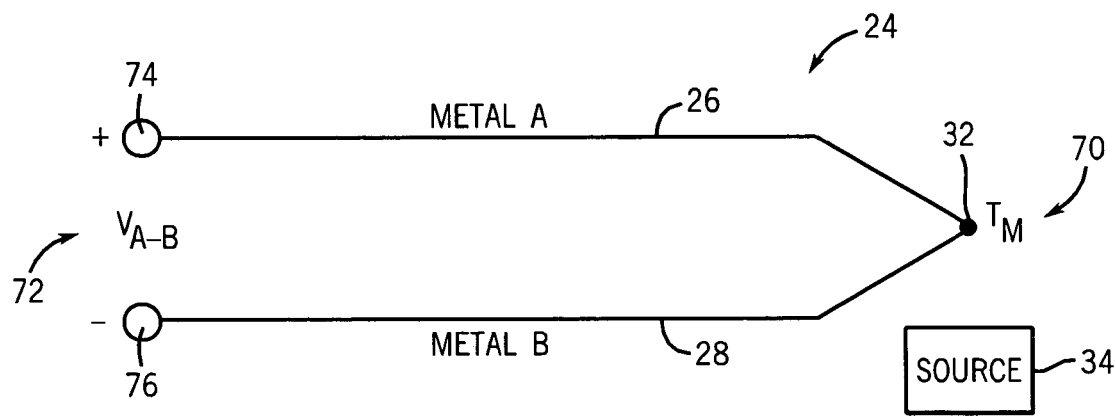
FIG. 3 is a is a diagrammatical representation of an exemplary thermocouple having a junction of two dissimilar metals.

FIG. 3 illustrates a basic concept of the exemplary thermocouple 24 represented in FIG. 1. When the junction 32 between two dissimilar metals 26 and 28 is heated or cooled, an open circuit voltage 72 (also called the Seebeck voltage 72) is generated as a function of the temperature $T_M$ 70 at the junction 32. In the illustrated embodiment, the temperature of a source 34 (hot or cold) is being measured. For a relatively close proximity of the measuring junction 32 (or probe tip) to the source 34, the temperature $T_M$ 70 should be substantially the same as the temperature of the source 34. The illustrated source 34 may be representative of any hot, ambient, or cold source in which the temperature is to be measured. Furthermore, although almost any two types of metal can be used to make a thermocouple, a number of standard types are used because they process predictable output voltages and large temperature gradients. For example, for a K type thermocouple, which is a common thermocouple, one metal 26 is nickel-chromium and the other metal 28 is nickel-aluminum. Standard tables may be generated to show the voltage produced by thermocouples at any given temperature. In the K type thermocouple, for example, the voltage produced at 300° C. is 12.2 millivolts. To measure voltage in this example, the ends 74 and 76 of the wires connect to the terminals 21 and 22 of FIG. 1. The voltage 72 may be converted to the temperature $T_M$ 70 at the junction 32, which is indicative of the temperature of the source 34 being measured. The voltage 72 varies with changes in temperature of the sensing or measuring junction 32. Thus, the Seebeck voltage 72 (or open-circuit voltage 72) between the two dissimilar metals 26 and 28 is used to calculate the measured temperature, $T_m$ 18. The two dissimilar metals may be encased in a probe wall, for example. Thermocouples are available either as bare wire "dead" thermocouples which offer, for example, low cost and fast response times, or the thermocouples may be built into probes. A wide variety of probes are available and may be suitable for different measuring applications (industrial, scientific, food temperature, medical research, etc.). Common types of connectors for probes are standard round pins and the miniature-type flat pins.

Thus is sum, thermocouples measure temperature by generating a millivolt signal proportional to the temperature difference between the junction of two dissimilar metals. One junction is typically encased in a sensor probe at the point of measurement, and the other junction is connected to the measuring or control instrument. Since the ambient temperature changes in the field or control room where the measuring instrument is located (typically the cold-junction), the actual millivolt signal generated by the thermocouple fluctuates accordingly, causing a "cold-junction error." Understanding of cold junction compensation is important because error in the measurement of cold junction will lead to error in the measured temperature from the thermocouple tip (measuring junction). The measuring instrument should also allow for the fact that the thermocouple output is typically nonlinear over relatively wide ranges of measured temperature. The relationship between temperature and output voltage may be a complex polynomial equation, for example, depending on the thermocouple type. Coefficients for the polynomial may be tabulated for the different types of thermocouples to accommodate non-linear behavior of the voltage and temperature relationship.

Figure 4:
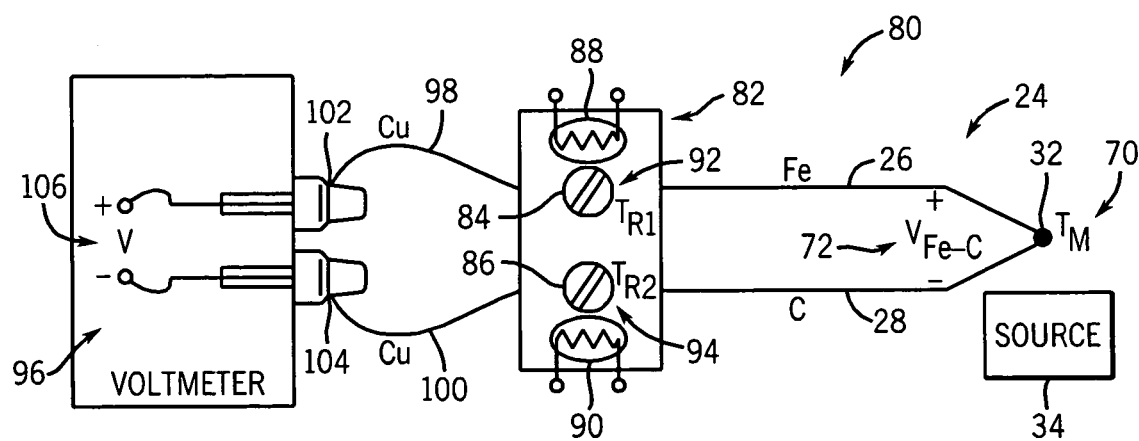
FIG. 4 is a diagrammatical representation of a thermocouple system having the thermocouple of FIG. 3, a terminal block, and a voltmeter.

FIG. 4 depicts a thermocouple assembly 80 having the thermocouple 24 with the wires 26 and 28 connected to a terminal block 82 having terminals 84 and 86. The two terminals 84 and 86 form a single channel for the thermocouple 24. The temperature at the terminals 84 and 86 are the cold junction (reference) temperature needed to calculate the measured temperature 70. Thermistors 88 and 90, whose resistance is a function of temperature, provide a way to measure the absolute temperature of the reference (cold) junction. The temperatures 92 and 94 at terminals 1 (84) and 2 (86), respectively, are depicted. For relatively narrow temperature ranges, a variety of other temperature sensors may be employed, such as diode or transistor junctions, thermistors, positive or negative temperature coefficient resistors, and so forth. The terminal block 82 is connected to a voltmeter 96 via the leads 98 and 100, which connect to the voltmeter 96 at connections 102 and 104. The voltmeter measures a voltage 106 to ultimately give the Seebeck voltage 72 to give the measured temperature 70.

In certain applications, the terminal block 82 may assume to be substantially isothermal, and thus only one temperature sensor, such as the thermistor 92, may be employed to measure the temperature of the reference junction. However, in other applications, there may be a temperature gradient across the terminal block 82, and multiple sensors 88 and 90 may be beneficial, especially in relatively high precision applications. To calculate the measured temperature 70, the reference (cold junction) temperatures, which are determined from the measured resistance of the thermistors 88 and 90, may be converted to its equivalent reference junction voltage. Then the measured voltage 106 may be added to this calculated reference voltage to find the Seebeck voltage 72. Finally, again, this Seebeck voltage 72 may be converted to the measured temperature 70 based on the known relationship between voltage and temperature for the given thermocouple and dissimilar metals. In certain applications, this procedure may be known as software compensation because it may rely upon the software of a computer to compensate for the effect of the reference junction.

The terminal block temperature sensors can be any device which has a characteristic proportional to absolute temperature, such as an RTD, a thermistor, or an integrated circuit sensor. It should be explained that devices, such as an RTD or thermistor that will measure absolute temperature may not be applicable to measure the process temperature 72. As discussed, the thermistor, RTD, and the integrated circuit transducer, for example, are only useful over relatively narrow temperature ranges. Thermocouples, on the other hand, may be used over a wide range of temperatures, and optimized for various atmospheres. Furthermore, thermocouple measurement becomes especially convenient when the application is to monitor a large number of data points. This may be accomplished, for example, by using the reference junction for more than one thermocouple element. As discussed, many thermocouples may be connected to the same block, with copper leads, for example, used throughout, and with the technique independent of the types of thermocouples chosen.

Figure 5:
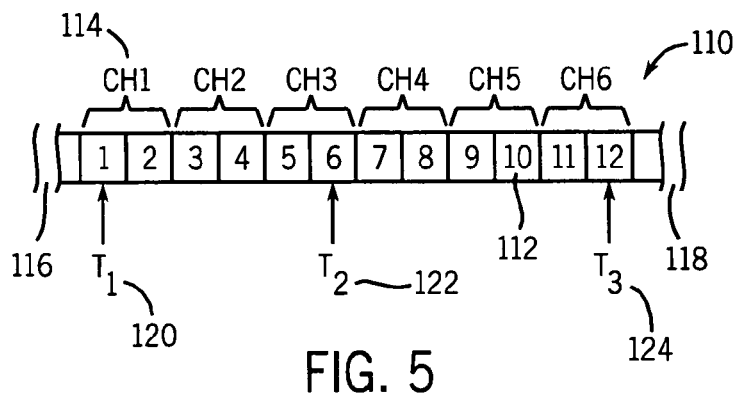
FIG. 5 is a graphical representation of a terminal strip or terminal block for a thermocouple in accordance with certain aspects of the invention.

FIG. 5 is a graphical representation of a terminal strip 110 having terminals 112 and channels 114. The terminal strip 110 is depicted having ends 116 and 118 that may continue or stop. In the illustrated embodiment, thermistors are installed at terminals 1, 6, and 12 to give temperatures T1 120, T2 122, and T3 124, respectively. In this example, thermistors or other temperature sensors are not installed on the remaining of the 12 terminals. Instead, temperature values for the remaining terminals 2, 3, 4, 5, 7, 8, 9, 10, and 11 are interpolated based on the measured temperature values 120, 122 and 124. Thus, for example, the cold junction temperature of channel 1 is determined by averaging the measured temperature value at terminal 1 with the interpolated temperature value of terminal 2. As another example, for the cold junction temperature of channel 2, the interpolated values of temperature for terminals 3 and 4 are averaged. Therefore, the cold junction temperature of all six channels may be accurately determined with only three thermistors disposed on the strip 110 in this example, avoiding the cost of utilizing a thermistor or other temperature sensor at each terminal which would require an additional nine thermistors.

This technique may be employed on a variety of terminal blocks, such as ordinary, open air, multi-tier screw terminal blocks, and such as those previously discussed. In this example, the thermocouple input channels are located consecutively on a single tier of the terminal block, and thus fall along a single axis. Because they lay along a single axis, and because the total distance from end to end is relatively small (e.g., less than three inches), there are primarily four basic shapes the temperature profile of the terminals should take depending on the environment.

Figure 6:
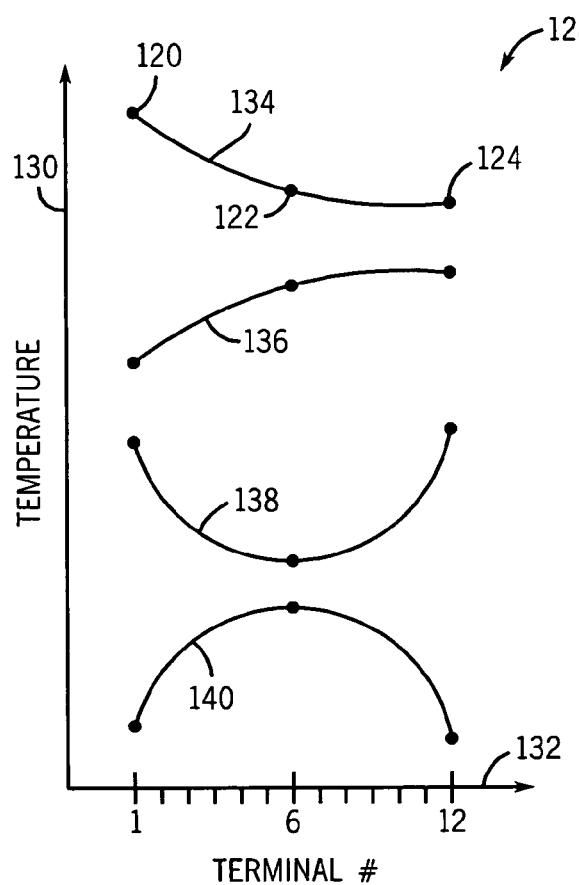
FIG. 6 is a plot of temperature vs. the terminal number for the terminal strip of FIG. 5.
Figure 7:
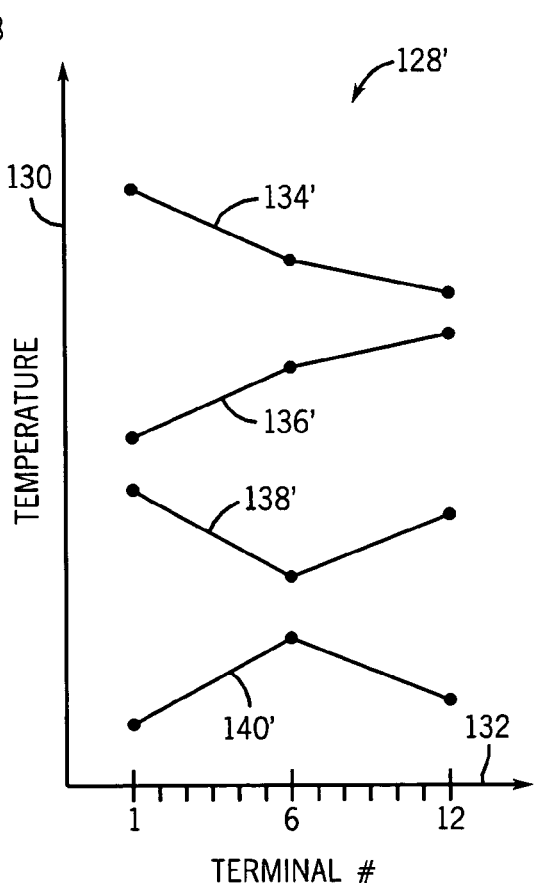
FIG. 7 is the same plot of FIG. 6, but depicting alternate behavior of the temperature.

Such shapes are illustrated in FIGS. 6 and 7, which are plots 128 and 128' of temperature 130 versus terminal number 132. The first curve 134 and 134 are monotonically decreasing, the second curves 136 and 136' are monotonically increasing, the third curves 138 and 138' are concave and the fourth curves 140 and 140' are convex. The general profile of the terminals can thus be determined by a minimum of three sensors, with one sensor located at either end of the row (or near the ends) and one sensor in the middle (or near the middle). Utilizing these three sensors in an appropriate interpolation algorithm one can determine the temperature of any terminal pair within a reasonable tolerance of the sensors accuracy. Using the algorithm will also allow some choice into exactly which terminals require the sensors. In general, the sensors may be located generally at equidistant points, with two of the sensors located near the ends of the terminal.

A firmware algorithm may be used to determine individual channel temperatures and may use linear or non-linear (i.e., logarithmic interpolation) on a three by two look-up table, for example, that has the three terminal locations as the X axis and the three corresponding temperatures as the Y axis. Input to the interpolation may be the mathematical position of the channel. For example, for a device having six channels, in consecutive order on terminal blocks numbered 1 through 12, channel 1 is on terminals 1 and 2, channel 2 is on terminals 3 and 4, and so on. For sensors (e.g., thermistors) located in the exemplary positions of terminals 1, 6, and 12, to determine the cold junction temperature of channel 2, input to the interpolation routine would be "3.5," for example, the representation of averaged or otherwise combined temperatures for terminals 3 and 4.

Figure 8:
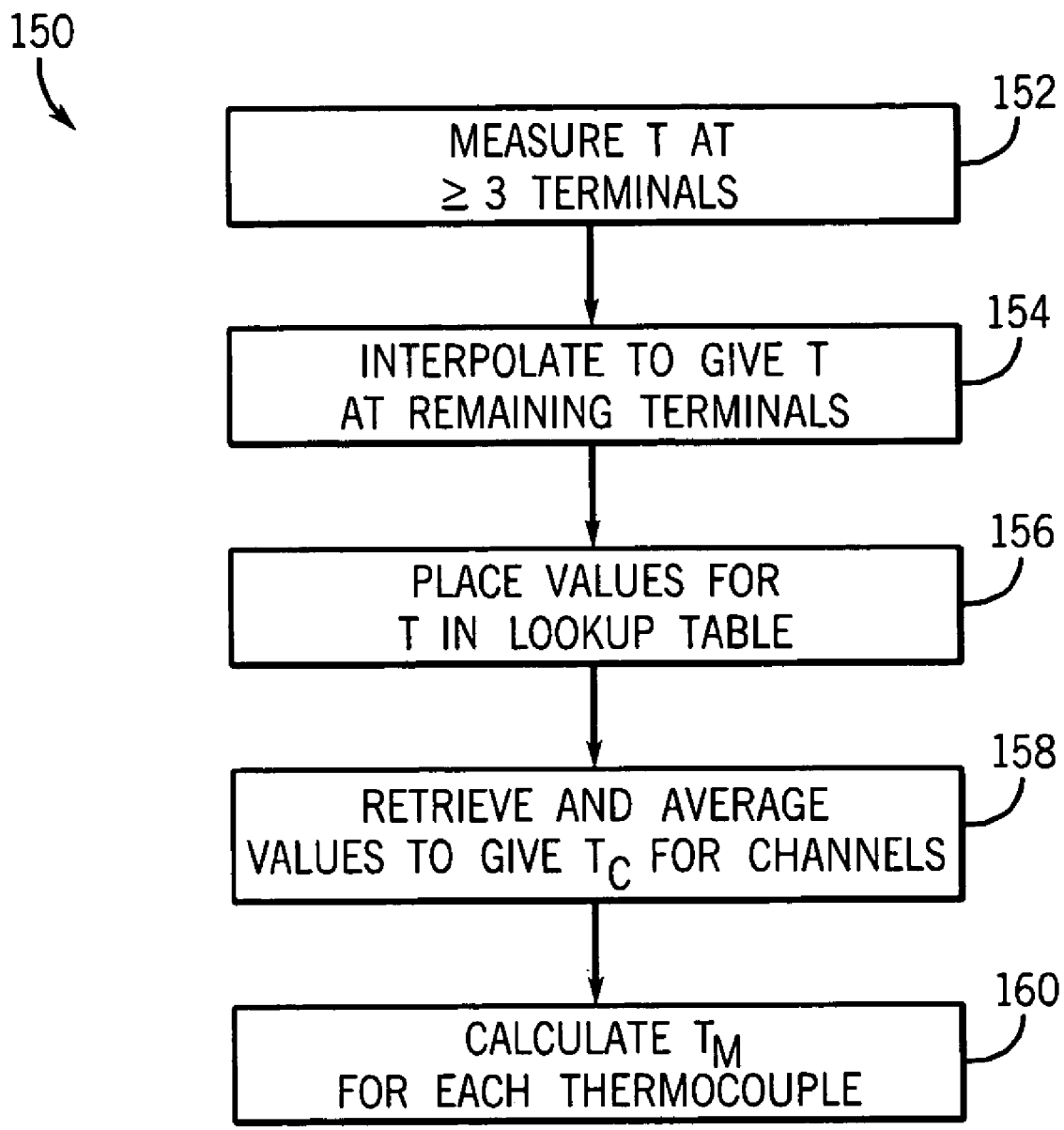
FIG. 8 is a block diagram of a method for calculating the measured temperature of a thermocouple.

FIG. 8 is a block diagram of a method 150 for determining cold junction and measured temperatures of a thermocouple. For a terminal block or terminal strip having several terminals, the temperature of three or more of the terminals are measured with a temperature sensor, such as a thermistor (block 152). The temperature values for the remaining terminals are determined by interpolating and/or extrapolating based on the measured temperatures at the three or more terminals (block 154). The interpolation and/or extrapolation may take a variety of forms, such as logarithmic, linear, and so forth. All of the temperatures values, whether measured or calculated via interpolation, may be placed in a look-up table, as depicted by reference numeral 156. These temperatures values in the look-up table may be retrieved and averaged to give the cold junction temperature for a given channel (block 158). For example, the temperature values for terminals 1 and 2 may be retrieved and averaged to give the temperature for channel 1, the values for terminals 3 and 4 may be retrieved and averaged to give the temperature for channel 2, and so forth. The cold junction temperature is then used to calculate the measured temperature of each thermocouple at the respective sources (block 160). In other words, based on the calculated value for the Seebeck voltage via the cold junction temperature measurement, the measured temperature may then be calculated for each thermocouple (block 160).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of using thermocouples, comprising:
disposing a temperature sensor at three or more respective terminals along a terminal row having a plurality of terminals adapted to receive thermocouple signals;
measuring temperatures at the three or more terminals;
calculating temperatures of remaining terminals based on measured temperature values of the three or more terminals having the disposed temperature sensors; and
calculating a cold junction temperature of the terminal row of at least one thermocouple channel based on measured or calculated temperature values of the terminals, or a combination thereof.

2. The method as recited in claim 1, comprising determining the temperature of a source measured by a thermocouple based on the cold junction temperature of the at least one thermocouple channel.

3. The method as recited in claim 1, wherein calculating temperature of remaining terminals comprises interpolation or extrapolation, or a combination thereof.

4. The method as recited in claim 1, wherein calculating temperature of remaining terminals comprises a linear.

5. The method as recited in claim 1, wherein a temperature profile along the terminal row is monotonically increasing.

6. The method as recited in claim 1, wherein the temperature sensor comprises a thermistor.

7. The method as recited in claim 1, wherein a temperature profile along the terminal row is monotonically decreasing.

8. The method as recited in claim 1, wherein a temperature profile along the terminal row is concave.

9. The method as recited in claim 1, wherein a temperature profile along the terminal row is convex.

10. The method as recited in claim 1, wherein calculating temperature of remaining terminals comprises a non-linear calculation.

11. The method as recited in claim 1, comprising placing measured and calculated temperature values of the plurality of terminals into a lookup table.

12. The method as recited in claim 11, wherein calculating the cold junction temperature of the at least one thermocouple channel comprises retrieving temperature values from the lookup table.

13. A method of measuring cold junction temperature in a multi-channel configuration, comprising:
disposing temperature sensors at three respective terminals on a row of terminals of a multi-channel input device;
measuring temperature at each of the three respective terminals;
interpolating or extrapolating, or a combination thereof, from the measured temperature at each of the three respective terminals to give calculated temperatures of remaining terminals on the row of the multi-channel input device; and
combining temperature values of two adjacent terminals along the row to determine the cold junction temperature of a channel, wherein the channel comprises the two adjacent terminals.

14. The method as recited in claim 13, comprising selecting the location of the three terminals to compute a non-linear temperature profile along the row of the multi-channel input device.

15. The method as recited in claim 13, wherein the three terminals comprise three or more terminals having disposed temperature sensors along the row of the multi-channel device.

16. The method as recited in claim 13, wherein the three terminals having disposed sensors are substantially equidistant in relation to one another.

17. The method as recited in claim 13, comprising placing temperature values of the three terminals and the remaining terminals in a lookup table.

18. The method as recited in claim 13, wherein the temperature values of the two adjacent terminals are measured or calculated, or a combination thereof.

19. The method as recited in claim 13, comprising determining the cold junction temperature of the channel by utilizing a firmware algorithm.

20. The method as recited in claim 13, wherein the row comprises six channels having two terminals each, and wherein the three terminals having disposed sensors comprise terminals 1, 6, and 12 in relative position along the row.

21. The method as recited in claim 13, wherein the row comprises six channels having two terminals each, and wherein the three terminals having disposed sensors comprise terminals 1, 6, and 11.

22. An apparatus for measuring cold junction temperature, comprising:
- means for measuring temperatures at three or more terminals along a terminal row having a plurality of terminals adapted to receive thermocouple wires;
- means for calculating the temperatures of remaining terminals based on measured temperature values of the three or more terminals; and
- means for calculating a cold junction temperature of the terminal row of at least one thermocouple channel based on measured or calculated values of the terminals, or a combination thereof.

23. The apparatus as recited in claim 22, comprising:
- means for determining the temperature of a source measured by a thermocouple based on the cold junction temperature of the at least one thermocouple channel, wherein the calculating the temperature of the remaining terminals comprises interpolation or extrapolation, or a combination thereof.

24. A computer program, provided on one or more tangible media, for measuring cold junction temperature of a thermocouple, comprising:
- a routine for measuring temperatures of the three or more terminals along a row of a multi-channel cold junction block comprising a plurality of terminals;
- a routine for calculating temperatures of other terminals of the plurality of terminals based on measured temperature values of the three or more terminals; and
- a routine for calculating cold junction temperatures of channels on the row based on temperature values of the plurality of terminals.

25. An instrumented multi-channel input/output terminal assembly comprising:
- a multi-channel terminal strip for receiving inputs from a plurality of thermocouples;
- at least three temperature sensors disposed at respective terminals along the terminal strip, the temperature sensors being configured to detect a temperature at a respective terminal along the terminal strip and to provide a signal representative of the temperature; and
- a processing circuit configured to receive the temperature signals from the at least three temperature sensors, wherein the processing circuit is configured to determine a temperature of other terminals not having temperature sensors along the terminal strip based upon the detected temperatures.

26. The assembly of claim 25, further comprising a printed circuit board coupled to the temperature sensors and to the processing circuit for routing the signals from the temperature sensors to the processing circuit.

27. The assembly of claim 25, wherein an input of a channel of the terminal strip comprises two terminals along the terminal strip.

* * * * *